US006973811B2

(12) United States Patent
Jenkyns

(10) Patent No.: US 6,973,811 B2
(45) Date of Patent: Dec. 13, 2005

(54) THEFT DETERRENT DEVICE FOR A MOTOR VEHICLE

(75) Inventor: Clifford Jenkyns, East York (GB)

(73) Assignee: Stud-It, Ltd., Braunfels, TX (US)

( * ) Notice: Subject to any disclaimer, the term of this patent is extended or adjusted under 35 U.S.C. 154(b) by 66 days.

(21) Appl. No.: 10/618,251

(22) Filed: Jul. 11, 2003

(65) Prior Publication Data

US 2005/0005657 A1   Jan. 13, 2005

(51) Int. Cl.[7] .......................... B60R 25/06; E05B 65/12
(52) U.S. Cl. ............................ 70/247; 70/461; 70/201
(58) Field of Search ..................... 70/245–247, 202, 70/211, 192–201, 203, 461, 451; 292/DIG. 60

(56) References Cited

U.S. PATENT DOCUMENTS

| | | | | |
|---|---|---|---|---|
| 1,378,308 A | * | 5/1921 | Adams .......................... | 70/254 |
| 1,581,035 A | * | 4/1926 | Stephenson .................. | 70/193 |
| 1,662,099 A | | 3/1928 | Anderson | |
| 4,077,276 A | * | 3/1978 | Knox, Jr. .................. | 74/473.21 |
| 4,615,355 A | | 10/1986 | Garcia et al. ............... | 137/383 |
| 4,747,279 A | | 5/1988 | Solow .......................... | 70/238 |
| 4,831,850 A | * | 5/1989 | Wong et al. .................. | 70/202 |
| 4,936,120 A | * | 6/1990 | Fiks ............................ | 70/202 |
| 5,020,390 A | * | 6/1991 | Chang ......................... | 74/608 |
| 5,179,868 A | | 1/1993 | Thibeault .................... | 74/411.5 |
| 5,228,320 A | * | 7/1993 | Liou ............................ | 70/247 |
| 5,473,918 A | * | 12/1995 | Hixon .......................... | 70/202 |
| 5,555,755 A | * | 9/1996 | Padrin .......................... | 70/247 |
| 5,561,996 A | * | 10/1996 | Chang .......................... | 70/247 |
| 5,570,600 A | * | 11/1996 | Hua ............................. | 70/247 |
| 5,778,710 A | * | 7/1998 | Hu et al. ...................... | 70/247 |
| 5,784,907 A | * | 7/1998 | Hu et al. ...................... | 70/203 |
| 5,890,383 A | * | 4/1999 | Chang .......................... | 70/247 |
| 5,899,100 A | * | 5/1999 | Rundle et al. ............... | 70/202 |
| 6,000,256 A | * | 12/1999 | Pornaghdi .................... | 70/247 |
| 6,382,000 B1 | * | 5/2002 | Horton ......................... | 70/163 |
| 6,425,613 B1 | * | 7/2002 | Shen .......................... | 292/348 |
| 6,705,135 B2 | * | 3/2004 | Witchey ....................... | 70/199 |

FOREIGN PATENT DOCUMENTS

| | | | | |
|---|---|---|---|---|
| EP | 0641692 A1 | 3/1995 | ........... | B60R 25/00 |
| GB | 2152454 A | 8/1985 | ........... | B60R 25/06 |
| GB | 2275034 A | 8/1994 | ........... | B60R 25/00 |
| GB | 2294249 A | 4/1996 | ........... | B60G 25/00 |
| GB | 2321630 A | 8/1998 | ........... | B60R 25/00 |
| WO | WO88/04246 | 6/1988 | ........... | B60R 25/06 |
| WO | WO94/04397 | 3/1994 | ........... | B60R 25/00 |

* cited by examiner

*Primary Examiner*—John B. Walsh
(74) *Attorney, Agent, or Firm*—Akin Gump Strauss Hauer & Feld, LLP

(57) ABSTRACT

A theft deterrent device for use with a wide range of motor vehicles. The device has a baseplate, a housing, and a gear-stick embracing element that can move relative to the housing. The gear stick of the motor vehicle passes through the gear-stick embracing element, which can be locked to prevent movement of the gear stick.

25 Claims, 10 Drawing Sheets

THEFT DETERRENT DEVICE FOR A MOTOR VEHICLE

BACKGROUND OF THE INVENTION

The present invention pertains to a theft deterrent device, and in particular relates to a theft deterrent device intended for use with a motor vehicle.

BRIEF DESCRIPTION OF THE RELATED ART

A variety of systems have been developed to prevent automobiles from being stolen. Some of the systems involve locking the vehicle transmission in some manner. The problems inherent in these systems are their complicated nature, the ease with which they are bypassed, and the difficulty of their installation. In particular, installation of these systems often requires design changes to the transmission or other mechanical parts of the automobile, or the customization of the system to the type of automobile in which it is installed, e.g., customizations necessary because of size or shape limitations of the automobile. Such customization is time-consuming and expensive. In addition, the same device could not be installed in the same manner for a right hand drive as for a left hand drive automobile. A device is needed that is simple to install for a wide range of automobiles, and readily available to the consumer without the need for customization of the device or the automobile.

In order to overcome at least some of the problems inherent in the complicated prior art devices, the present invention provides a theft deterrent system that is simple yet versatile in construction and can be easily incorporated into a variety of different types of automobiles, without the need for mechanical, structural, or design changes to the automobile or parts thereof.

SUMMARY OF THE INVENTION

The present invention relates to a versatile theft deterrent device for use with a wide range of motor vehicles.

According to one embodiment of the present invention, the theft deterrent device comprises a baseplate adapted to be secured to a motor vehicle, a housing adapted to be secured to the baseplate, a gear-stick embracing element mounted on the housing for movement relative to the housing, and a lock operably located in the gear-stick embracing element to lock the gear-stick embracing element with respect to the housing, thereby preventing movement of the gear-stick embracing element and the gear stick. According to another embodiment of the present invention, the gear-stick embracing element is located within the housing, and the lock is located in the housing to lock the gear-stick embracing element with respect to the housing.

The housing has a plurality of housing apertures that can be aligned with a selected set of baseplate apertures from a plurality of baseplate apertures in the baseplate. Fasteners are inserted through the aligned housing apertures and the selected set of baseplate apertures, thereby securing the housing to the baseplate.

The baseplate can be any of a wide range of shapes and sizes, thus enabling a consumer to select a baseplate of an appropriate size or shape that fits and can be secured to a particular motor vehicle. Regardless of the shape or size of the baseplate, the housing can still be secured to it by way of the baseplate apertures and the housing apertures. Moreover, because the baseplate is separable from the housing, the consumer can use the same housing with more than one type of baseplate. In addition, the housing can be attached to the baseplate at different rotational positions, thereby enabling this device for use in a wide range of vehicle shapes, sizes, and configurations, as well as right hand or left hand drive vehicles.

In order that the invention may be more readily understood, and so that further features thereof may be appreciated, the invention will now be described, by way of example, with reference to the accompanying drawings.

DETAILED DESCRIPTION OF THE INVENTION

Figure 1:
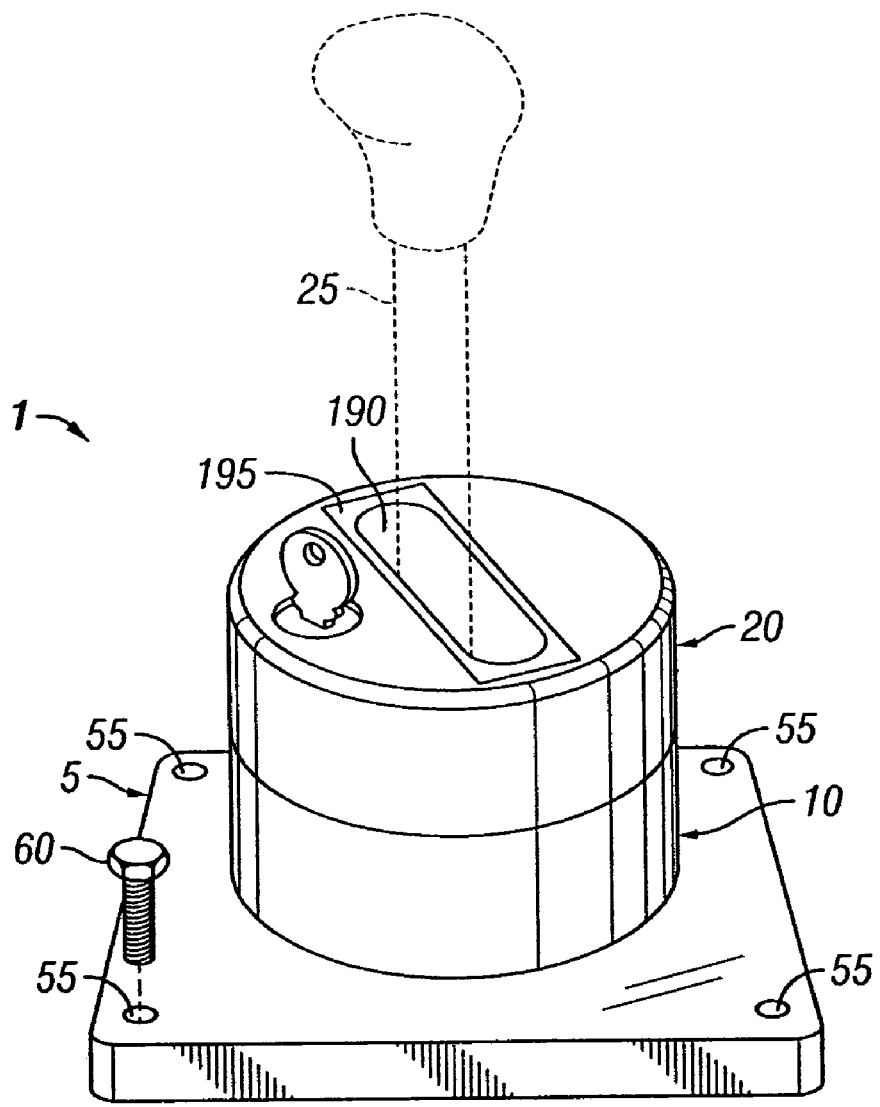
FIG. 1 is a perspective view of a theft deterrent device in accordance with a first embodiment of the invention, with a gear stick of a motor vehicle shown in phantom.

Referring initially to FIGS. 1 to 5 of the accompanying drawings, and particularly to FIG. 1, a vehicle theft deterrent device 1 in accordance with a first embodiment of the invention is illustrated. The theft deterrent device 1 comprises a baseplate 5 adapted to be secured to the body of a motor vehicle, a housing 10 adapted to be secured to the baseplate 5, and a gear-stick embracing element 20 mounted on the housing 10. The gear-stick embracing element 20 is adapted to receive and lock a gear stick 25 against movement, to thereby prevent normal operation of the vehicle to which the theft deterrent device is attached.

Figure 2:
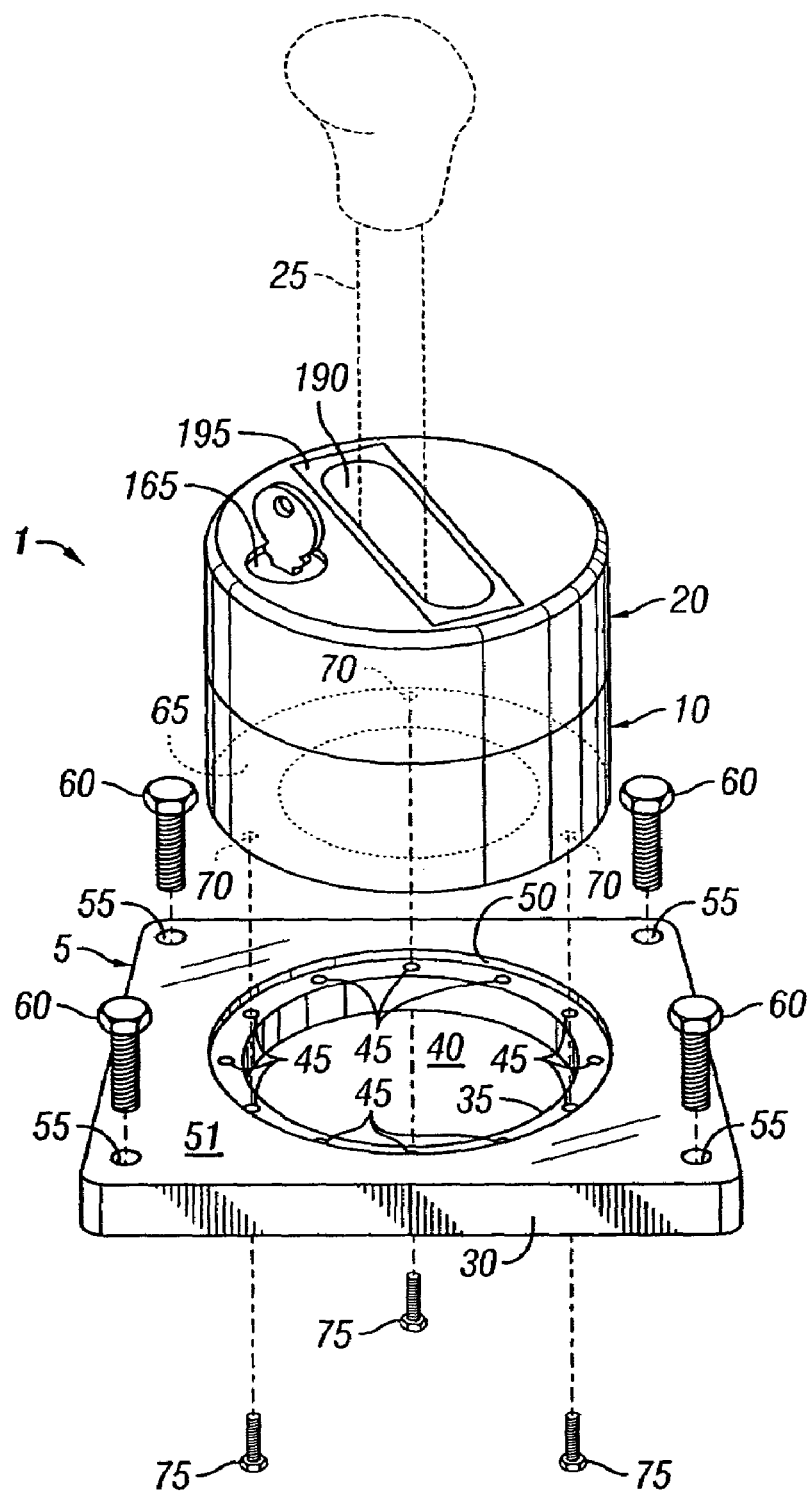
FIG. 2 is a perspective view of the theft deterrent device of FIG. 1, illustrating details of the components of the device and the manner of securing the housing to the baseplate of the device.
Figure 5:
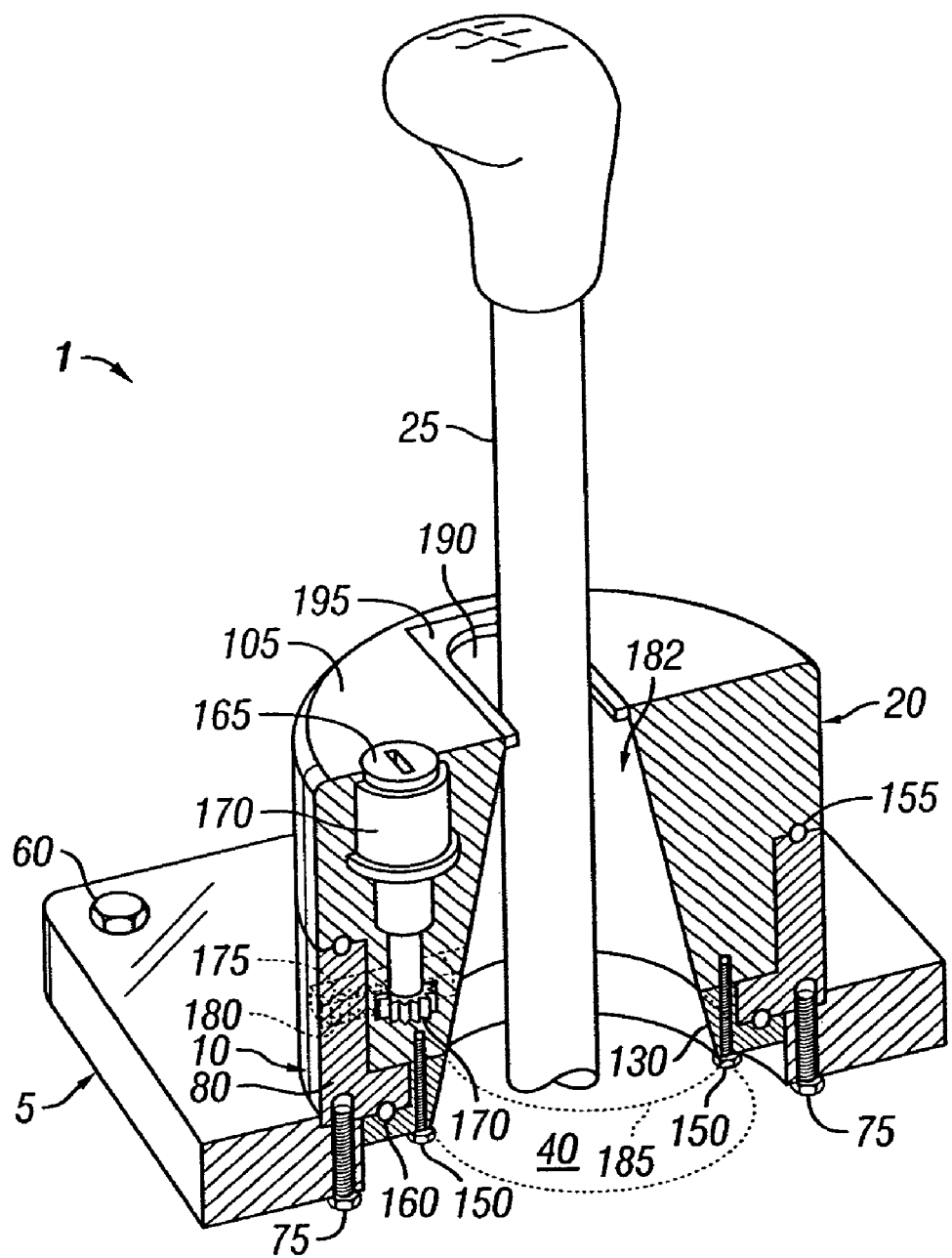
FIG. 5 is a cut-away perspective view of the theft deterrent device of FIG. 1 when mounted in position in a motor vehicle.

Referring now to FIG. 2, the baseplate 5 preferably comprises a substantially planar body having an outer perimeter 30, and an inner perimeter 35, which is formed by a hole 40 in the body of the baseplate 5. The hole 40 can be positioned anywhere in the body of the baseplate 5. The hole 40 surrounds the gear stick 25 when the theft deterrent device 1 is installed in a motor vehicle, as shown in FIG. 5.

Referring again to FIG. 2, a plurality of baseplate apertures 45 circumscribe the inner baseplate perimeter 35 formed by the hole 40. According to one embodiment, the baseplate apertures 45 are in an annular depression 50, which preferably is formed in an upper surface 51 of the baseplate 5 adjacent the hole 40. In another embodiment, the annular depression 50 may be replaced with an annular protrusion, or eliminated altogether depending on the particular configuration of the housing 10.

Outside of the depression 50, but inside the outer baseplate perimeter 30 is a plurality of baseplate bores 55, which are each adapted to receive a baseplate fastener 60 to secure the baseplate 5 to the motor vehicle. At least one of the baseplate fasteners 60 preferably comprises a bolt, such as a shear bolt. When a shear bolt is used, a substantial part of the head of the bolt snaps off as the bolt is tightened, with the consequence that the bolt cannot readily be removed. Other well-known means for securing the baseplate 5 to a motor vehicle can be used, including screws, rivets, welding, clamping, and so on.

Figure 3:
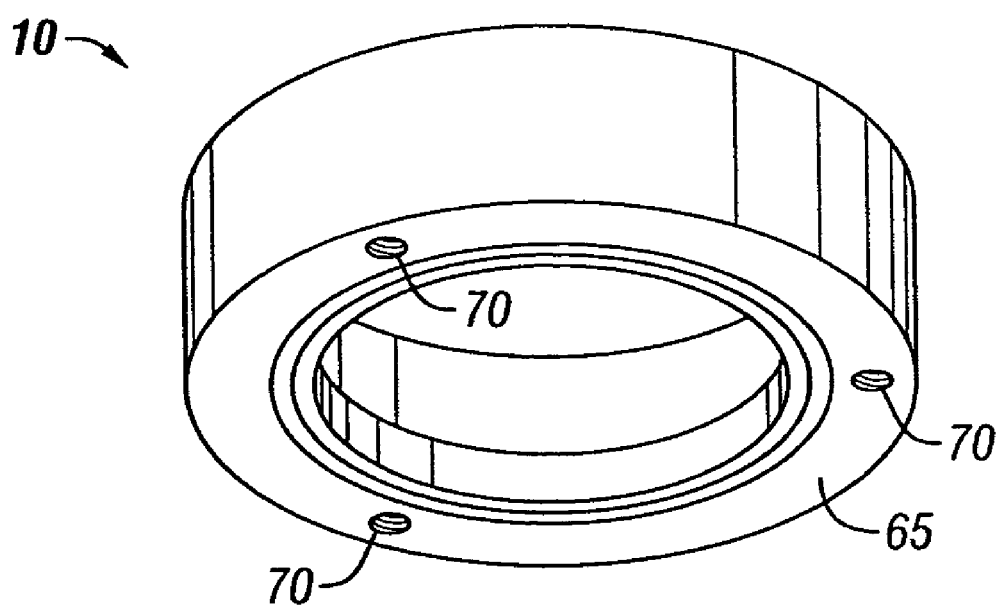
FIG. 3 is a bottom plan view of the underside of the housing of the theft deterrent device of FIG. 1.

Referring now to FIG. 3, a simplified bottom plan illustration of the housing 10 is used to show how the housing 10 is adapted to be secured to the baseplate 5 (FIG. 2). The housing 10 has an underside 65, where a plurality of housing apertures 70 is provided. Any of housing apertures 70 can be aligned with a respective baseplate aperture 45 (FIG. 2). Although only three housing apertures are shown, it will be understood that more or less apertures can be provided.

Referring now to FIG. 2, when the housing apertures 70 are aligned with the baseplate apertures 45, a fastener, such as a bolt 75, is used to secure the housing 10 to the baseplate 5. The bolt 75 can be a shear bolt, or any other securing means known to those of ordinary skill in the art including screws, rivets, clamping, and so on.

The attachment of the housing 10 to the baseplate 5 according to the theft deterrent device of the present invention is particularly advantageous because the housing 10 is secured to the baseplate 5 from its underside 65. Once the housing 10 has been secured to the baseplate 5, and the baseplate 5 has been secured to the motor vehicle, the underside 65 is extremely difficult to access for a would-be car thief.

Figure 4:
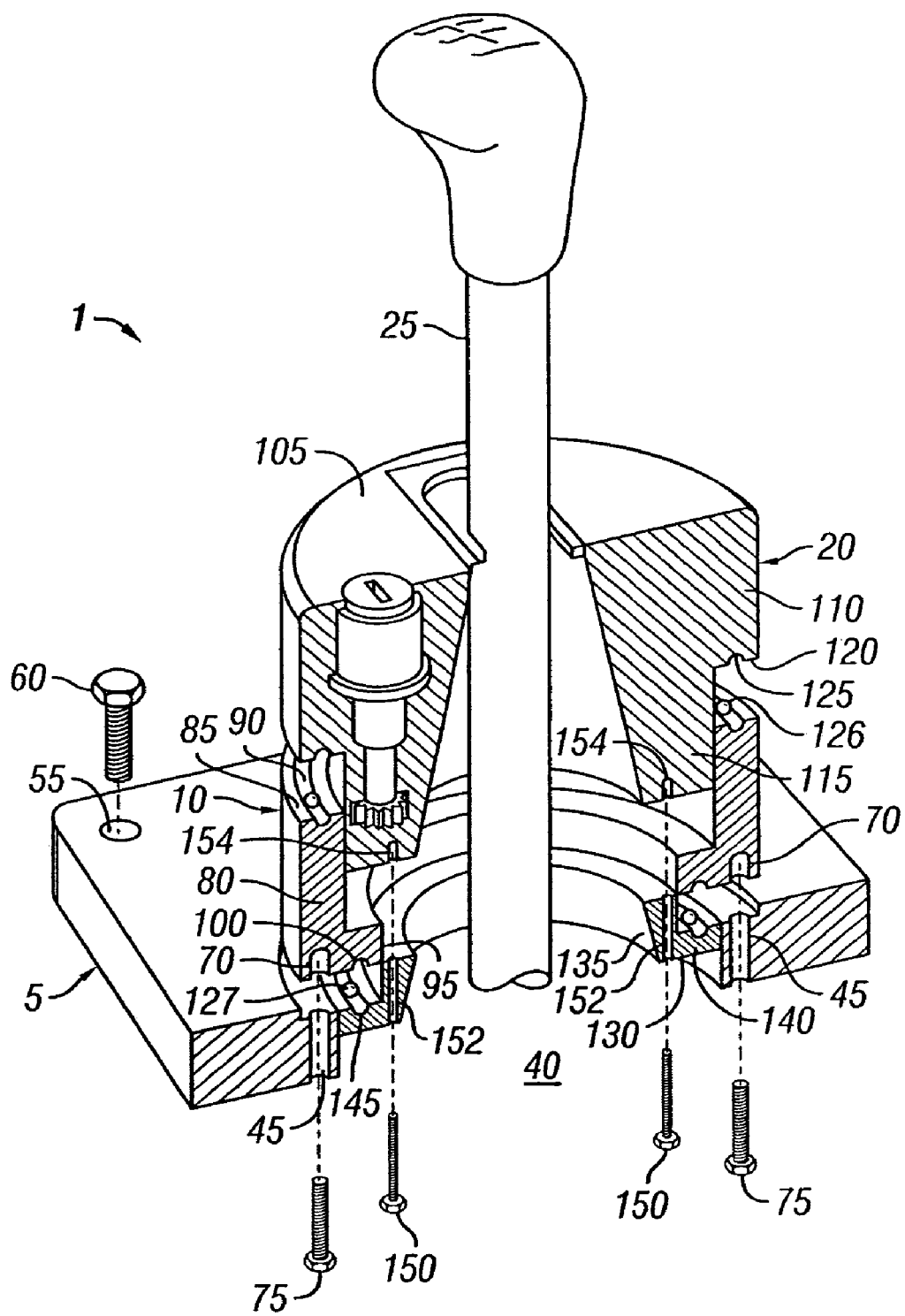
FIG. 4 is a cut-away perspective view of the theft deterrent device of FIG. 1, illustrating details of the housing.

Referring now to FIG. 4, the theft deterrent device 1 is illustrated in an exploded view so as to describe details of its assembly. The housing 10 is preferably of substantially hollow cylindrical form, and is formed of a continuous wall 80. The wall 80 has an upper edge 85, with an upper annular housing groove 90 formed therein. The wall 80 also has an inwardly directed flange 95 extending from it. The inwardly directed flange 95 has a lower annular housing groove 100 formed in its under-surface.

The gear-stick embracing element 20 is adapted for mounting on the housing 10 for rotation relative thereto. The gear-stick embracing element 20 is shown in FIG. 4 in its unmounted position. The gear-stick embracing element 20 is formed of an upper component 105 and a lower component 130. The upper component 105 is of substantially cylindrical form, having an upper portion 110 and a lower portion 115. The upper portion 110 has an outer diameter substantially equal to the outer diameter of the wall 80. The lower portion 115 is stepped inwardly with respect to the upper portion 110, so that the lower portion 115 can be received within the cylindrical inner space of the housing 10 that is defined by a portion of the wall 80 above the flange 95. The inward stepping of the lower portion 115 creates a downwardly facing step surface 120 in the upper portion 110. The downwardly facing step surface 120 has a step surface groove 125 formed therein that faces the upper housing groove 90 of the wall 80 to thereby form an upper bearing raceway 155 (FIG. 5) into which ball bearings 126 are received.

The lower component 130 has an upwardly extending flange 135 and an outwardly extending flange 140. The upwardly extending flange 135 is received within the circular opening defined by the inwardly directed flange 95 of the housing 10. The outwardly directed flange 140 is located immediately beneath the inwardly directed flange 95. The outwardly extending flange 140 has a flange groove 145 in its upper surface that faces the lower housing groove 100 to thereby form a lower bearing raceway 160 (FIG. 5) into which ball bearings 127 are received. The lower component 130 of the gear-stick embracing element 20 is adapted to be secured to the upper component 115 by way of lower component holes 152 and upper component holes 154. When lower component holes 152 are aligned with respective upper component holes 154, a fastening device such as a screw 150, is used to secure the upper component 115 and the lower component 130 together.

Referring now to FIG. 5, the theft deterrent device 1 is shown as it would appear assembled and ready for operation in a motor vehicle. In particular, FIG. 5 shows the gear-stick embracing element 20 in its mounted position on the housing 10, and the upper component 105 and lower component 130 of the gear-stick embracing element 20 secured together by means of a plurality of bolts 150 inserted through aligned lower and upper component holes 152 and 154 (FIG. 4). According to one embodiment, the bolts 150 have shear heads. Based on the description and accompanying drawings, it will be understood by one of ordinary skill in the art that the gear-stick embracing element 20, formed of the components 105 and 130 is securely connected to the housing 10, but is rotatable relative thereto due to the upper and lower bearing raceways 155 and 160.

A lock comprising a key operated body 165 is provided in the upper component 105. The key operated body 165 is operably connected to a drivable pinion 170, which is engaged with a locking bolt 175 that is capable of generally axial movement with respect to the pinion 170. A radial bore 180 provided in the wall 80 has an open end on the interior of the wall 80 to receive the locking bolt 175. When the key operated body 165 is actuated such that the locking bolt 175 is aligned with and has been driven partly into the bore 180, then the locking bolt 175 locks the gear-stick embracing element 20 so that it cannot rotate relative to the housing, which prevents movement of the gear stick 25. When the key operated body 165 is actuated such that the locking bolt 175 is driven radially inwardly and is withdrawn from the bore 180, then the gear stick 25 and the gear-stick embracing element 20 can be moved and normal vehicle operation can proceed.

When the theft deterrent device 1 is assembled as shown in FIG. 5, such that the upper component 105 and lower component 130 of the gear-stick embracing element 20 are secured together, then components 105 and 130 define a through-passage 182 for the gear stick 25. The through-passage 182 receives the upper part of the gear stick extending from hole 40. The lower end of the through-passage 182 comprises a first slot 185 defined by the lower component 130. The width of the first slot 185 is preferably slightly greater than the width or diameter of the gear stick 25. The upper end of the through-passage 182 comprises a second slot 190 defined by the upper component 105. The second slot 190 preferably has a width that is slightly greater than the width or diameter of the gear stick 25. The second slot 190, however, has an axis that extends generally perpendicularly to the axis of the first slot 185. The periphery of the second slot 190 may be provided with a guide element 195 to minimize rattling. The guide element 195 may be formed of plastic or other materials known to those of ordinary skill in the art.

It is to be appreciated that when the key operated body 165 is actuated such that the locking bolt 175 is driven into the bore 180, then the theft deterrent device 1 is in the "locked position". In the locked position, the gear stick 25 is constrained by the first slot 185 and by the transversely extending second slot 190, and thus cannot be moved. However, when the key operated body 165 has been actuated to retract the locking bolt 175 from the bore 180, then the theft deterrent device is in the "unlocked position". The gear-stick embracing element 20 is free to rotate, and the gear stick can be moved.

The baseplate 5 can be of any shape or size, for example, rectangular, square, circular, oval, oblong shapes, etc. Similarly, the hole 40 can be a variety of shapes and sizes. As the hole 40, and in particular the baseplate 5, can be any of a wide range of shapes and sizes, a consumer need only select a baseplate of an appropriate size or shape that fits and can be secured to a particular motor vehicle. In addition, any one housing could be used with more than one shape or size baseplate, thus the theft deterrent device of the present invention can be provided as a kit comprising a housing and two or more baseplates.

Figure 6:
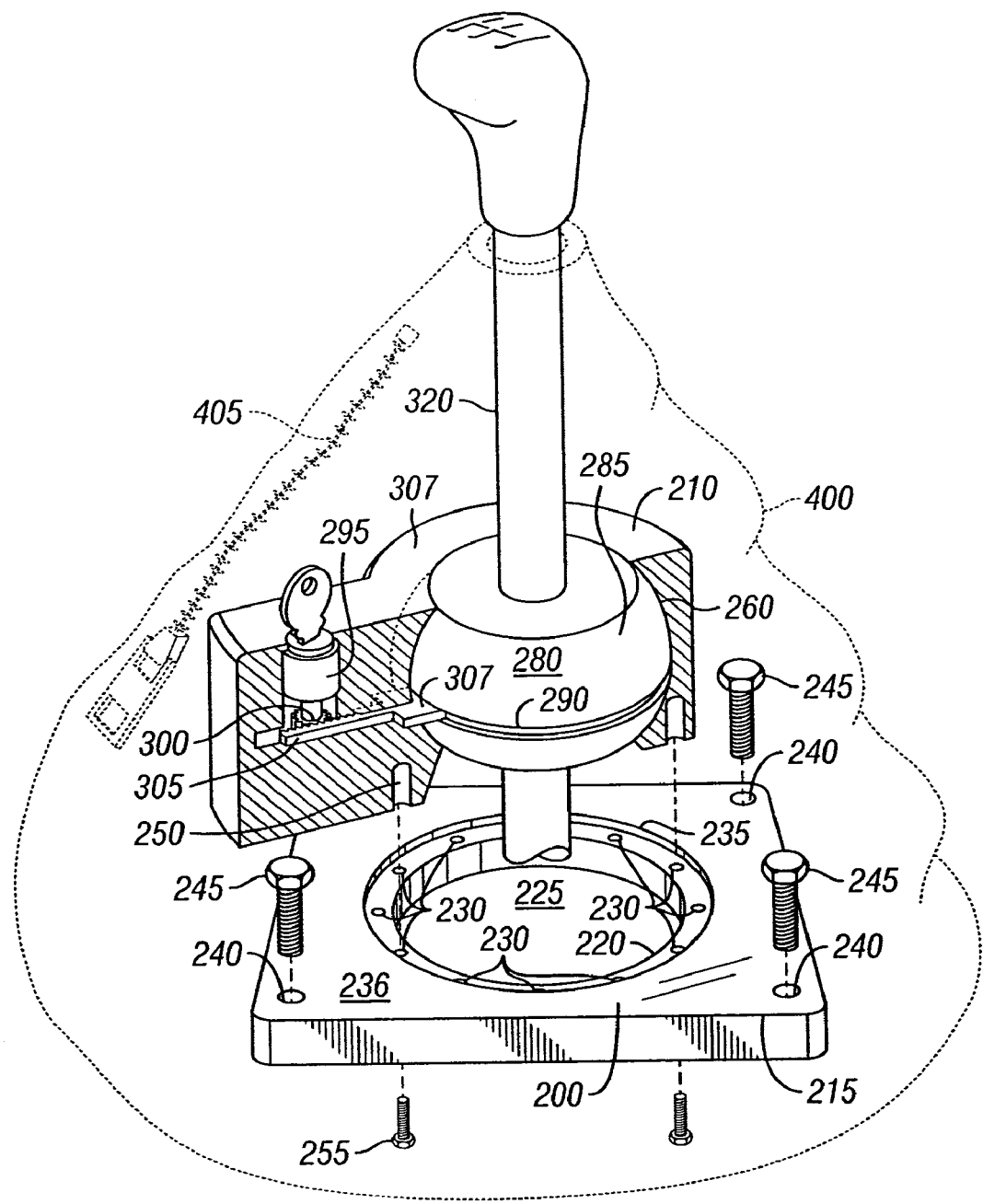
FIG. 6 is a cut-away perspective view of a theft deterrent device in accordance with a second embodiment of the invention.

FIGS. 6 to 9 illustrate a theft deterrent device in accordance with another embodiment of the invention. As shown in FIG. 6, the theft deterrent device comprises a baseplate 200 and a housing 210. As in the embodiment illustrated in FIGS. 1–5, the baseplate 200 has an outer perimeter 215 and an inner perimeter 220, which is formed by a hole 225. A plurality of baseplate apertures 230 circumscribe the inner perimeter 220.

Preferably, the baseplate apertures 230 are in an annular depression 235, which preferably is formed in an upper surface 236 of the baseplate 200 adjacent the hole 225. In other embodiments, the annular depression 235 may be replaced with an annular protrusion, or may be eliminated altogether depending on the particular configuration of the housing 210.

As in the embodiment illustrated in FIGS. 1–5, a plurality of baseplate bores 240 are located outside of the depression 235, but inside the outer baseplate perimeter 215. Baseplate bores 240 are each adapted to receive a baseplate fastener 245 to secure the baseplate 200 to the motor vehicle. At least one of the baseplate fasteners 245 preferably comprise a bolt, such as a shear bolt. Other well-known means for securing the baseplate 200 to a motor vehicle can be used, including screws, rivets, welding, clamping, and so on.

Figure 7:
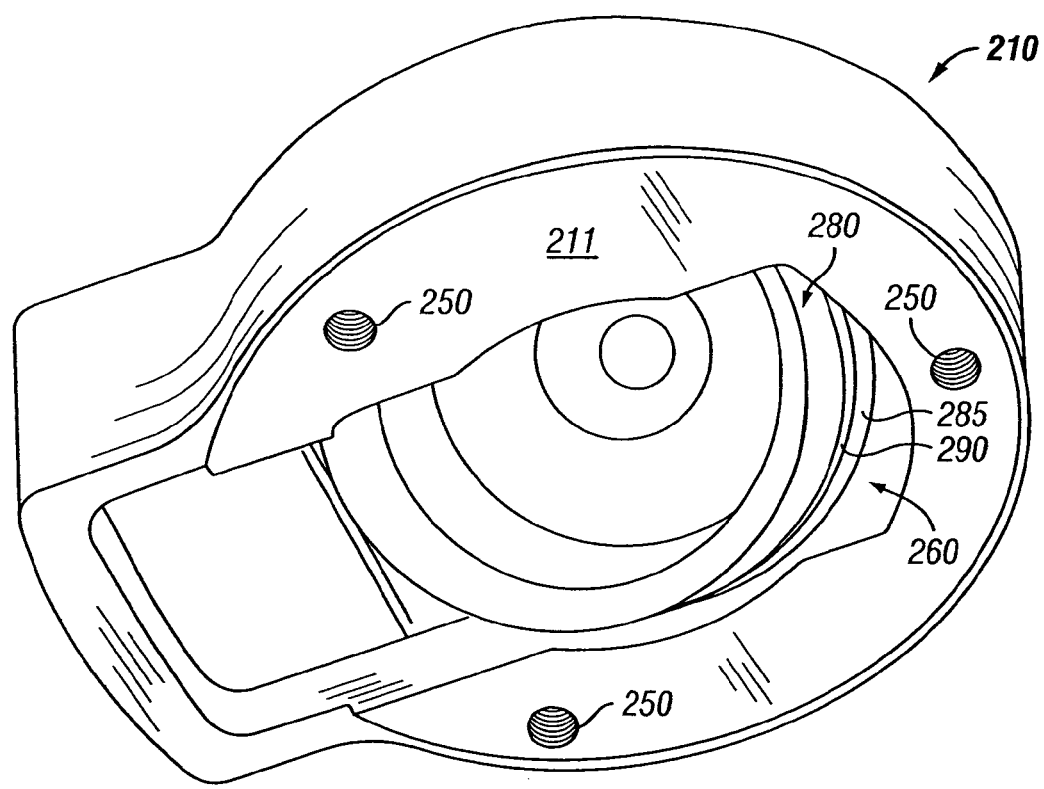
FIG. 7 is a bottom plan view of the underside of the housing of the theft deterrent device of FIG. 6.
Figure 8A:
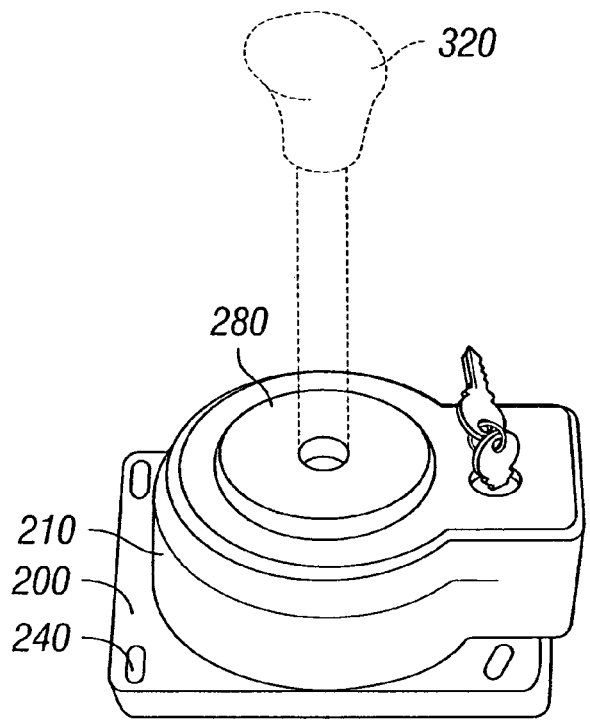
FIGS. 8A–8D are top plan views of the theft deterrent device of FIG. 6, illustrating rotational positions of the housing with respect to the baseplate.
Figure 8B:
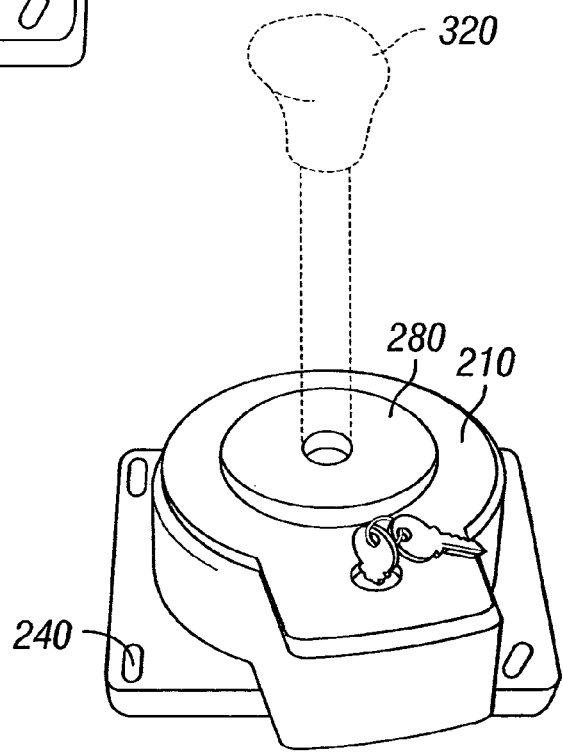
Figure 8C:
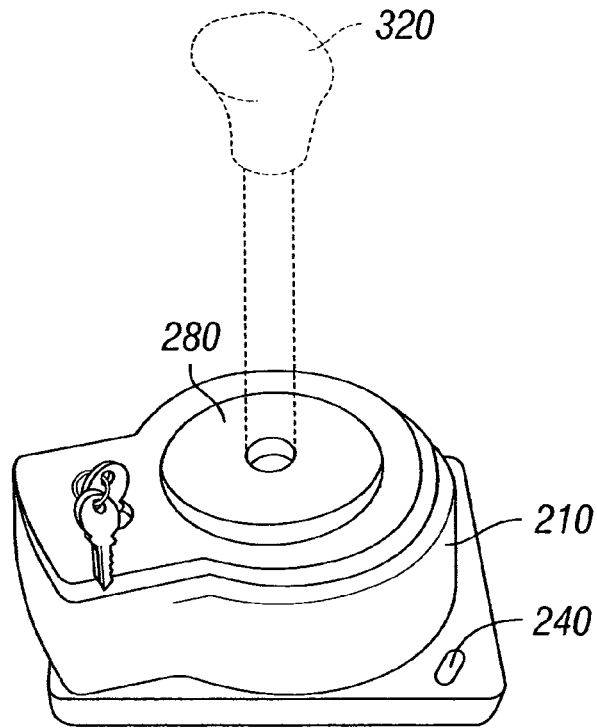
Figure 8D:
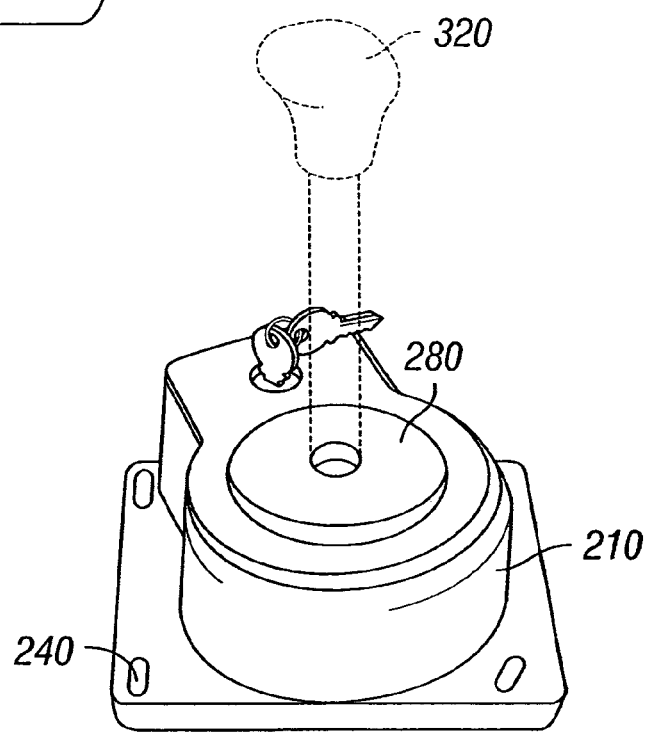

Referring now to FIG. 7, the housing 210 has an underside 211, where a plurality of housing apertures 250 is provided. Any of the housing apertures 250 can be aligned with any of the baseplate apertures 230. When the housing apertures 250 are aligned with the baseplate apertures 230, a fastener, such as a bolt 255, can be received in a housing aperture 250 and its respectively aligned baseplate aperture 230 to secure the housing 210 to the baseplate 200. The bolt 255 preferably comprises a shear head bolt.

Preferably, the plurality of baseplate apertures 230 is greater in number than the plurality of housing apertures 250, so that the housing 210 can be attached to the baseplate 200 at different rotational positions with respect to the baseplate 200 to accommodate different vehicle configurations. Examples of different rotational positions of the housing 210 are illustrated in FIGS. 8A–8D. The manner in which the housing 210 attaches to the baseplate 200 enables the device for use with a wide range of vehicle shapes and sizes, as well as right hand or left hand drive vehicles.

Referring now to FIGS. 6 and 7, the housing 210 may be of any appropriate form, but preferably includes a semi-spherical recess 260. A gear-stick embracing element 280 is received within the semi-spherical recess 260. The gear-stick embracing element 280 has a semi-spherical exterior surface 285 that is received within the semi-spherical recess 260. An equatorial groove 290 is present in the semi-spherical exterior surface 285.

Referring to FIG. 6, the housing 210 is further provided with a lock comprising a key-operated body 295. The key-operated body 295 is adapted to drive a pinion 300, which in turn drives a locking bolt 305 capable of generally axial movement with respect to the pinion 300 to a "locked" or an "unlocked" position.

Figure 9:
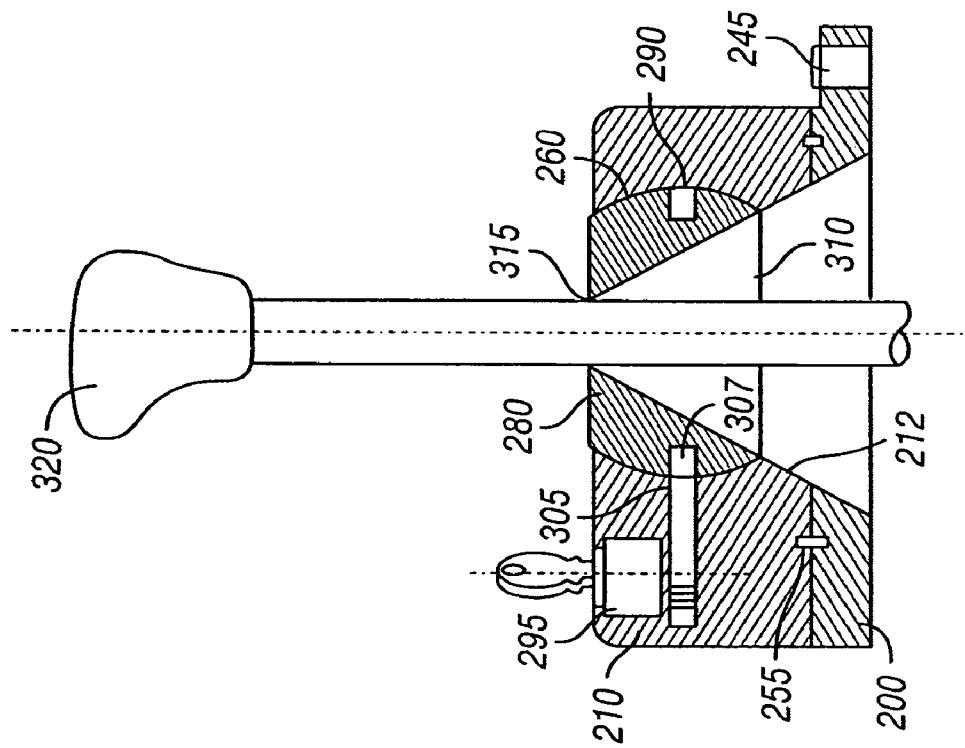
FIG. 9 is a sectional view of the theft deterrent device of FIG. 6, illustrating the theft deterrent device in a locked position.

FIGS. 6 and 9 illustrate the locking bolt 305 in the locked position. It can be seen that when the locking bolt 305 is in the "locked" position, a distal end portion 307 is in engagement with the equatorial groove 290 formed in the gear-stick embracing element 280, thus locking the element 280 in position.

Figure 10:
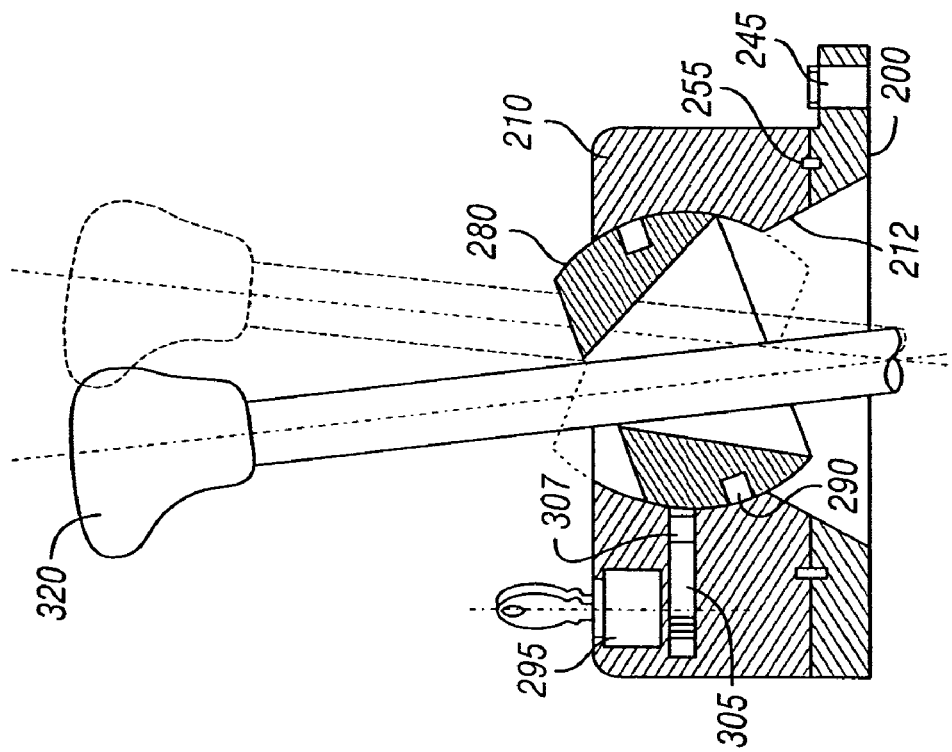
FIG. 10 is a sectional view of the theft deterrent device of FIG. 6, illustrating the theft deterrent device in an unlocked position.

When the locking bolt 305 is in the "unlocked" position, as shown in FIG. 10, the distal end portion 307 is clear of the equatorial groove 290, thus permitting the gear-stick embracing element 280 to rotate freely.

Referring again to FIG. 9, the gear-stick embracing element 280 includes a through-passage 310 with a substantially circular upper end 315 that has a diameter slightly greater than the diameter or width of a gear stick 320 with which the device is to be used. The through-passage 310 diverges downwardly from the upper end 315 in a substantially conical manner.

Housing 210 includes a passage 212, which extends generally downwardly in a conical manner from the semi-spherical recess 260 to the baseplate 200. When the locking bolt 305 is in the locked position as illustrated in FIGS. 6 and 9, the diverging through-passage 310 of the gear-stick embracing element 280 is substantially aligned with the passage 212 in the housing 210.

In the locked position, the gear-stick embracing element 280 cannot rotate, therefore, the gear stick 320 is restrained against movement, thus preventing shifting between gears in the motor vehicle and normal vehicle operation. In contrast, when the locking bolt 305 is in the unlocked position, as illustrated in FIG. 10, the gear-stick embracing element can rotate, thus enabling movement of the gear stick 320. Consequently, the motor vehicle may be used in the usual way.

It will be appreciated that the embodiment illustrated in FIGS. 6 to 10 will operate in a manner similar to that described above with reference to the embodiment of FIGS. 1 to 5. The baseplate 200 and the hole 225 can have a variety of shapes and sizes, e.g., rectangular, oval, circular, narrow, wide, etc. In addition, a boot 400 may be provided, with an associated zipper 405 to conceal the theft deterrent device according to either of the illustrated embodiments.

It is to be understood that the baseplate and the housing may be made of any suitable material, but it is preferred to use a strong material, which is resistant to drilling or sawing. Similarly, the other components of the theft deterrent device may be made of a suitably strong material. While the invention has been described with reference to two specific embodiments, it is to be appreciated that these are illustrative embodiments. A wide range of modification, change, and substitution is intended in the disclosure herein, and many modifications may be effected without departing from the scope of the invention as defined in the following claims. Accordingly, it is appropriate that the claims be construed broadly and in a manner consistent with the scope of the invention.

I claim:

1. A theft deterrent device for use in a motor vehicle, comprising:
   a baseplate adapted to be secured to a motor vehicle, said baseplate having a plurality of baseplate apertures;
   a housing adapted to be secured to said baseplate, said housing having a plurality of housing apertures that are less in number than said baseplate apertures and are alignable with said baseplate apertures in a plurality of different positions relative thereto;
   a gear-stick embracing element adapted to be secured to said housing for movement relative to said housing, said gear-stick embracing element defining a passage through which a gear stick of a motor vehicle may pass; and
   a lock operably connected to at least one of said housing and said gear-stick embracing element, said lock being adapted to engage the other of said housing and said gear-stick embracing element to prevent movement of said gear-stick embracing element with respect to said housing.

2. A device according to claim 1 further comprising:
   a housing fastener having a first end that is received by one of said plurality of housing apertures and a second end that is received by an aligned one of said plurality of baseplate apertures to thereby secure said housing to said baseplate.

3. A device according to claim 2 wherein said baseplate has a plurality of baseplate bores for receiving a corresponding number of baseplate fasteners to thereby mount said baseplate to the motor vehicle.

4. A device according to claim 3, wherein said baseplate fasteners comprise shear headed bolts.

5. A device according to claim 2 wherein said housing fastener comprises a shear headed bolt.

6. A device according to claim 1, wherein said lock comprises
   a key operated body;
   a drivable pinion operably connected to said key operated body; and
   a locking bolt engaged with said pinion such that actuation of said key operated body moves said locking bolt in a direction generally axial to said pinion and between an extended position with respect to said housing and a retracted position with respect to said housing.

7. A device according to claim 6 wherein said key operated body is located in said gear-stick embracing element, and said extended position of said locking bolt extends said locking bolt into a bore located in said housing.

8. A device according to claim 6 wherein said key operated body is located in said housing, and said extended position of said locking bolt extends said locking bolt into a groove located in said gear-stick embracing element.

9. A device according to claim 1 wherein said housing comprises a substantially cylindrical wall having an upper edge with an upper housing groove formed therein and an inwardly directed flange extending from said wall, said inwardly directed flange having an undersurface with a lower housing groove formed therein.

10. A device according to claim 9 wherein said gear-stick embracing element comprises:
    a substantially cylindrical upper component having a top portion and a lower portion that is inwardly stepped with respect to said top portion thereby forming a downwardly facing step surface of said upper component;
    a step surface groove formed in said downwardly facing step surface and facing said upper housing groove; and
    a lower component adapted to be secured to said upper component.

11. A device according to claim 10 wherein said lower portion of said gear-stick embracing element is received within said housing.

12. A device according to claim 10 further comprising ball races engaged in a raceway formed by said upper housing groove and said step surface groove, thereby rendering said gear-stick embracing element rotatable relative to said housing.

13. A device according to claim 10 wherein said upper and lower components are secured together by shear headed bolts.

14. A device according to claim 10 wherein said lower component comprises an upwardly extending flange adapted to be secured to said upper component, an outwardly extending flange, and a flange groove located in said outwardly extending flange and facing said lower housing groove.

15. A device according to claim 14 further comprising ball races engaged in a raceway formed by said lower housing groove and said flange groove, thereby rendering said gear-stick embracing element rotatable relative to said housing.

16. A device according to claim 1 wherein said passage comprises a first slot having a first axis and a width slightly in excess of the width of said gear stick, and a second slot, having a second axis substantially perpendicular to said first axis and having a width slightly greater than the width of said gear stick.

17. A device according to claim 1 wherein said housing has a wall in which a bore is formed, said lock is mounted on said gear-stick embracing element, and is adapted to drive a locking bolt from a retracted position in which said element is free to rotate, to an extended position in which said locking bolt is partly received within said bore, thus preventing rotation of said gear-stick embracing element.

18. A device according to claim 1 wherein said gear-stick embracing element is secured within said housing.

19. A device according to claim 18 wherein said housing defines a semi-spherical recess, said gear-stick embracing element has a semi-spherical exterior surface, and is received within said semi-spherical recess of said housing.

20. A device according to claim 19 wherein
    said gear-stick embracing element has a groove; and
    said lock comprises a key operated body received within said housing and a locking bolt adapted to be driven by said key operated body from a retracted position to an extended position in which said locking bolt extends at least partly into said groove in said gear-stick embracing element.

21. A device according to claim 20 wherein said groove is an equatorial groove.

22. A device according to claim 19 wherein said housing has a plurality of housing apertures adapted to receive a first end of at least one housing fastener, and said baseplate has a plurality of baseplate apertures to receive a second end of said at least one housing fastener to secure said housing to said baseplate.

23. A device according to claim 22 wherein said baseplate has a plurality of baseplate bores for receiving at least one baseplate fastener.

24. A device according to claim 1 wherein said gear-stick embracing element is secured on said housing.

25. A device according to claim 1, wherein said housing apertures are formed in an underside of said housing and said housing is secured to said baseplate by at least one housing fastener having a first end received by one of said housing apertures in said underside and a second end received by an aligned one of said baseplate apertures.

* * * * *